Patented Aug. 9, 1949

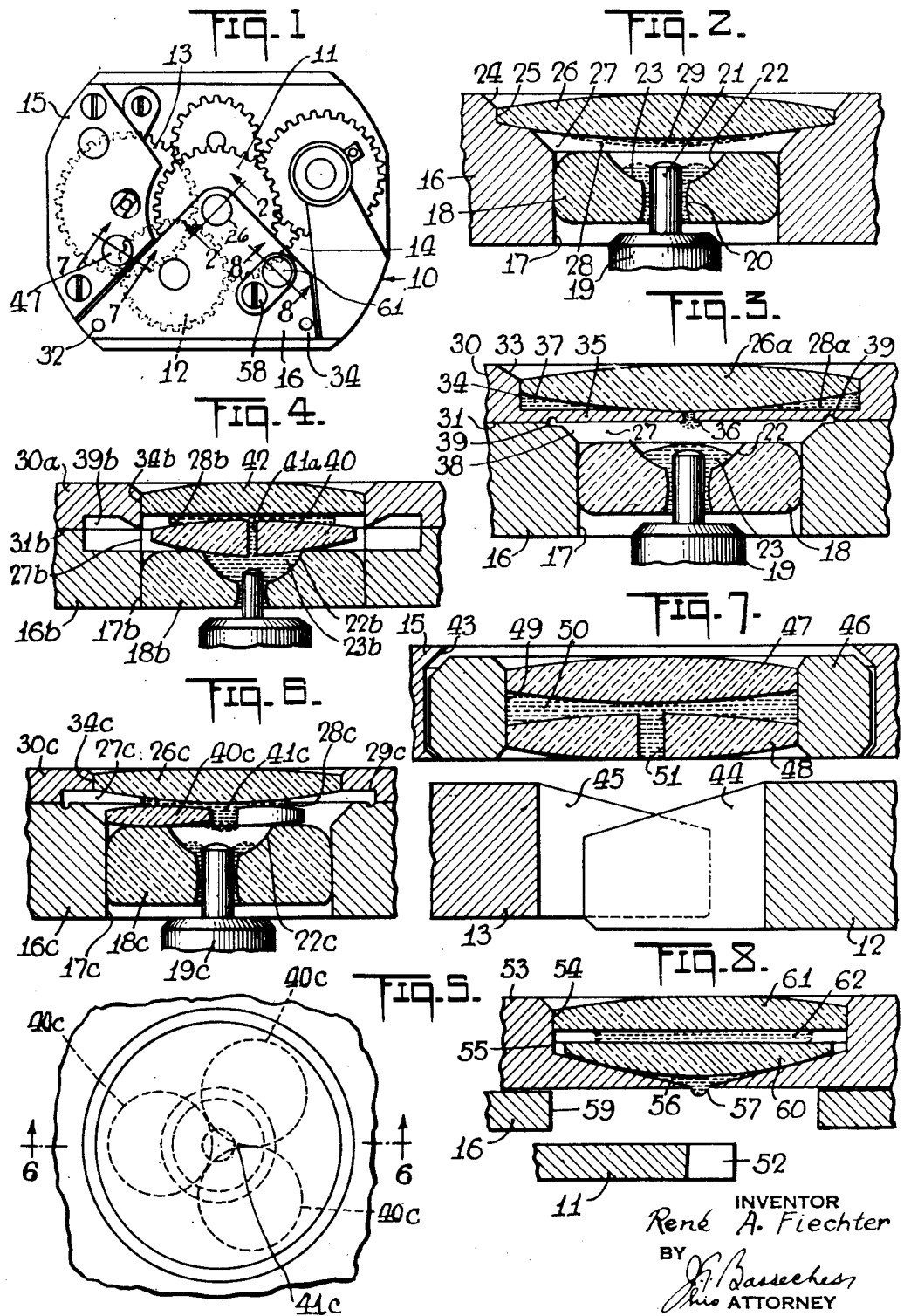

2,478,865

UNITED STATES PATENT OFFICE 2,478,865

LUBRICATING JEWELED BEARINGS OF WATCH MOVEMENTS AND LIKE INSTRUMENT PARTS

René A. Fiechter, Great Neck, N. Y., assignor of one-half to Allen V. Tornek, New York, N. Y.

Application May 3, 1947, Serial No. 745,680

13 Claims. (Cl. 308—121)

This invention relates to improvements in lubricating jeweled bearings of watch movements. Still more particularly this invention relates to improved lubrication to prolong the retention of lubricants employed in delicate instruments, such as watches.

It is known to me to provide bearings for the trunnions of gears and moving parts of delicate instruments, such as fine watches with jewel bearings and to lubricate them to reduce the friction of these moving parts. The functions of the jewel bearings are dual in character, in that a fine lubricant in a minute quantity is retained within a socket portion of the jewel bearing so that the reduction in friction is effected by the combined action of a lubricated bearing for the trunnion portion or like contacting part. The effective life of the bearing and the trunnion in contact with the bearing accurately to maintain a relatively constant component of resistance as to movement by the motive power, such as the spring, is dependent upon the persistance of the lubricant in contact with the bearing surfaces between the trunnion and the jewel.

The life span of the lubricant is relatively short, as occasioned by displacement of the lubricant from the socket in the jewel bearing adjacent the trunnion or the accumulation of dust or gumming of the lubricant. Particularly is the loss of lubricant likely where, as in a wrist watch which is subjected to some degree of shock on the wearer's wrist, displacement of the lubricant from the effective area is increased.

Accordingly, it is an object of my invention to provided means for increasing the durability and life of the lubricant employed in the bearing portions of delicate instruments, such as watch movements and to provide for a retention of an increased quantity of lubricant over that presently employed so that an augmented quality of valuable lubricant will be present. Still more particularly, it is an object of my invention to provide jewel bearings for delicate instruments, such as watch movements, in which an overabundant localized quantity of lubricant is made available, to be supplied to the bearing surfaces as usage may effect a displacement of the normal quantity applied and which, upon becoming displaced from the effective bearing surface, will be augmented as conditions, such as the movement of the instrument, may serve to distribute an excess supply to the effective areas.

Still more particularly it is an object of my invention to provide means for lubricating bearing surfaces of delicate instruments, including watch movements and other like instruments and their parts, particularly those in which the friction is reduced by combined jewel bearings and lubricants in contacting with the bearing surfaces wherein the durability of the lubricant is increased and the effective value of the lubricant prolonged, with a minimum amount of deterioration.

To attain these objects and such further objects as may appear herein, or be hereinafter pointed out, I make reference to the accompanying drawing forming a part hereof, in which—

Figure 1 is a plan view of the back panel of a watch movement;

Figure 2 is a magnified sectional view taken on the line 2—2 of Figure 1;

Figure 3 is a view similar to Figure 2, showing another embodiment of my invention;

Figure 4 is a view similar to Figure 2, illustrating a still further embodiment of my invention in connection with the lubrication of a jewel bearing;

Figure 5 is a fragmentary plan view illustrating a still further embodiment of my invention in connection with the lubrication of a jewel bearing;

Figure 6 is a section taken on the line 6—6 of Figure 5;

Figure 7 is a fragmentary section taken on the line 7—7 of Figure 1;

Figure 8 is a fragmentary section taken on the line 8—8 of Figure 1.

Making reference to the drawing, I illustrate my invention for the preservation of lubricant used in duplicate instruments in connection with a watch movement 10 which is illustrated to expose the usual back surface, at which point may be observed the various watch movement parts, such as the train of gears associated with the main spring gear casing, the hair spring and the balance wheel. In the illustration made merely for purposes of exemplification, I show the pinions 11, 12, 13 and 14 which are visible, and are supported in the end plates 15 and 16. The end plate 16 is provided with the boring 17, into which is chased the jewel bearing 18, trunnioning the stem 19 in the bearing aperture 20, through which the trunnion 21 extends into the oil cavity 22.

In accordance with the general practice, the cavity 22 may hold a quantity of lubricant 23, the inadequacy whereof over long periods of time it is an object of my invention to overcome. Accordingly, I form a counterboring 24, which merges along its tapered walls into the boring 17, retaining the jewel bearing 18. A stepped shoulder portion 25 is chased into a covering member 26, thereby providing a sealed cavity 27 over the jewel bearing 18.

In accordance with one embodiment of my invention, I may augment the lubricant 23 by an aditional application of lubricant 28. This I may do by applying an application of lubricant 28 to the under surface 29 of the covering 26. The film spreading properties of the cover 26 may be controlled by selecting the cover 26 of the same material as the jewel 18, or by coating a metallic cover 26 with an application of a coating composition having the same wetting compatability to the lubricant as the jewel bearing 18. Such film forming material as "Aretol," the tradename of a product known in Switzerland and which leaves a transparent film minimizing capillarity, may be employed. The association of the cover 26, either in the form of a jewel or a metallic member, coated as aforesaid to modify its compatability to the oil for being wetted, serves more or less to seal the cavity 27 and at the same time prevent flooding of the oil into the cavity 22.

The sealing of the cavity 27, especially with a jewel covering 26, minimizes gumming of the lubricant 23 and 28, and assures an abundant localized supply which transfers from the surface 29 to the cavity 22, especially in use in a wrist watch or other rapidly movable instrument, where the shock of movement aids in distorting the globule of lubricant and transferring a quantity thereof into the desirable locality.

While I may take existing bearings in any instrument, and counter-bore the apertures on the exposed face to include a cover 26, I may mount the covering jewel held in a separate plate or carrier. This form of construction is illustrated in the exemplification shown in Figure 3 wherein the plate 16 has superimposed on it a covering plate 30, which overlies the surface 31 and is generally of the same configuration, and held thereto by screws 32 or other separable attaching means. The plate 30 is counter-bored at 33 to provide a boring 34 and a bottom or diaphragm 35, which traps and localizes an extra quantity of oil. The boring 34 in the plate 30 is positioned complementary to the boring 17 in the plate 16 and includes a minute aperture 36, which serves as a communicating passage between the well 37 in the boring 33 and the cavity 27 above the bearing 18. The boring 34 may be filled with a quantity of lubricant 28a, and then covered with the covering plate 26a, as in the prior example. The plate 30 may then be superimposed on the surface 31.

The edges 38 common to the wall defining the cavity 27 are enlarged by the chamfer 39, acting to break up the capillary action in the meeting surfaces of the plate 30 and the plate 16. In this embodiment, lubricant 23 in the cavity 22 is augmented periodically through the aperture 36, without unduly flooding the cavity 22. The cover member 26a, where formed of a generally lenticular jewel, serves gradually to accumulate the lubricant 28a toward the axial line adjacent the aperture 36, to supplement the supply of lubricant 23 in the cavity 22.

In still another embodiment of my invention, as illustrated in Figure 4, the plate 16b has a boring 17b into which is chased a jewel bearing 18b, as in the prior examples. I may, in this example, however, have a cover 30a formed with a counter-boring 34b, positioned complementary to the boring 17b. A chamfered area or rim 39b serves to break up the capillary action at the meeting line 31b between the plates 16b and 30a for the cavity 27b. In this embodiment I position a generally lenticular distributing jewel 40 to cover the cavity 22b of the jewel bearing 18b. The distributing jewel includes a boring 41, extending therethrough adjacent a covering jewel 42 retained in the counter-boring 34b. The arrangement permits of the inclusion of lubricant 23b in the well 22b, with a quantity of lubricant 28b localized in the cavity between the cover 42 and the distributing jewel 40.

In this embodiment, the distributing jewel 40 is smaller than the boring 17b. Movement of the instrument carrying the plate 16b serves to permit movement of the distributing jewel 40 and thereby to pick up the lubricant 28b and distribute it through the aperture 41a, adjacent the cavity 22b, augmenting the supply thereof 23b as it may become consumed in the operation of the instrument.

In a still further embodiment of my invention (Figure 6), the instrument plate 16c may be counter-bored at 17c to receive a jewel bearing 18c for the trunnion 19c. A covering plate 30c is bored at 34c to carry a jewel covering 26c, as in the embodiment illustrated in Figure 4, and thereby define a well or cavity 27c for an augmented quantity of lubricant 28c. The parting surfaces adjacent the well 27c are bordered by a capillary area or rim 29c, as in the prior embodiments.

In the present embodiment I may include distributor members or lenses 40c. This includes three such members radially positioned with respect to the axis of the bearing in edgewise contact, to outline therebetween an aperture 41c for distributing the lubricant 28c to the cavity 22c in the upper face of the bearing 18c. The size and spacial arrangement of the three distributing jewels 40c permit free sliding movement, to pick up lubricant which may adhere to the under face of the covering jewel 26c and bring it into position over the cavity 22c. This will serve to augment the lubricant normally positioned in the cavity 22c, as wear and usage effect a loss of this material.

While I have, in the embodiment illustrated, supplemented the lubricant for the bearing and the trunnion pin 21, I may likewise supply lubricant for the pinion teeth. In Figure 7, the plate 15 is shown formed with a boring 43 which bridges a point between inter-meshing sections of the pinions 12 and 13 for the gear teeth 44 and 45, respectively, carried by said pinions. I chase within the boring 43 a ring 46 which carries a lenticular covering jewel 47 and a distributing jewel 48, thus providing a well 49 for the lubricant 50. Discharge of the lubricant 50 is through an aperture 51 which is positioned at a point common to the pinion teeth 44 and 45. Here again, the mutual attraction of the jewels 47 and 48 for the lubricant 50 serve to retain a quantity of the lubricant in position, to cause periodic discharge of minute quantities of the lubricant to the aperture 51 adjacent the pinion teeth 44 and 45. In this manner, the lubricant normally applied to the pinion teeth 44 and 45 is periodically augmented.

In Figure 8 I have illustrated means whereby the pinion teeth 52 of the pinion 11 may be supplied with additional quantities of lubricant. In this embodiment, the plate 16 has mounted thereover a holder 53 which may be counter-bored at 54 to provide a well 55 and a diaphragm 56, having a discharge aperture 57, which may be positioned directly over the pinion teeth 52 of the pinion 11. It will be understood that while I may overlie the plate 53 and hold it there the aforementioned position by the fastening screws 58, the boring 54 may be formed directly in the plate 16 over the pinion teeth 52 in a boring 59 formed in the plate 16. The diaphragm or bottom 56 supports a distributing jewel 60, whose lower section is generally convexly ground to make limited edge contact with the tapered face of the diaphragm 56 at its upper surface. The edges of the distributing jewel 60 are spaced from the boring 54 to provide lateral movement.

A covering jewel 61 is chased in the boring 54 to provide a space 62 for lubricant which may spread over the upper surface of the distributing jewel 60, over the edges along the upper surface of the diaphragm 56 until it discharges through the aperture 57 and oils or lubricates the gear 11 and its teeth 52.

In the embodiments illustrated, while the cover members in each case may be a chased jewel, metal or other material may be employed. Where metal or material other than a jewel, such as fused or natural aluminum oxide is employed, the polished surface may be treated so that the distribution of the lubricant is progressive, especially where feeding apertures or passages exist between the point of discharge and the point where lubricating oil is to be provided, to augment a well of a bearing as in the embodiments illustrated in Figures 2, 3, 4 and 5, or to directly lubricate pinion teeth, in the embodiments illustrated in Figures 7 and 8.

While I have described and prefer a cover member of generally lenticular contour as serving to accumulate a globule of lubricant in latent position to coalesce with or move toward the lubricant in the bearing cavity, it will be understood that the cover member 12 may be given various forms to accentuate the effect of accumulating the quantity of lubricant, and such means as a cavity, or star-shaped protuberance may be employed.

While I have described the cover member as made of jewel material, such as fused aluminum oxide, natural ruby, garnet, or metal coated with "Aretol" in that these materials are incompatible with the oil lubricant employed and do not spread in such a way as to lose the lubricant at the desired bearing surface, it will be understood that oil incompatibility may be procured to localize the retention of the lubricant adjacent the well by treatment of metal to render it grease-free, or otherwise clear its surface, to minimize film spreading.

Accordingly, by "oil incompatible surface" I mean to include surfaces such as those employed in jewel bearings or metals treated to prevent film spreading by treatment with "Aretol" or metal which has been de-greased and its surface cleared to prevent film spreading which may prevent an accumulation of globules of the lubricant for transfer to the oil cavities surrounding the portions of the bearing.

I wish further to distinguish my invention over a common practice known to me for providing the bearings for the balance wheel and escapement in watch movements which may have counter-bearings providing thrust bearings of cooperating jewels. In such construction, the end thrust jewel and the side thrust jewel bearings are in such close proximity as to provide a capillary space and reliance is made upon this capillary relationship to retain the initial lubricant for the counter-bearing for end and side thrust lubrication. The capillary so produced is not suitable for retaining an augmenting supply of lubricant.

It will be understood that while I have disclosed the various lubricated wearing surfaces such as the jewel bearings and pinion teeth in a position where gravitational action augments the same, the opposed face of the movement or instrument may be similarly provided with the features of my invention, especially valuable in a portable and mobile instrument as a watch when the inversion of position may occur.

In this manner, it will be observed that I have provided an effective means for augmenting the supply of oil or lubricant in the bearings of fine instruments employing jewels to seal the lubricant or oil, and minimize gumming or contamination, preventing oxidation or evaporation, as well as to furnish an auxiliary supply which is distributed as the original supply becomes exhausted or depreciated, thus increasing the time cycle for cleaning and lubricating the instrument.

Having thus described my invention and illustrated its use, what I claim as new and desire to secure by Letters Patent, is:

1. In a delicate instrument comprising a watch movement or the like having lubricated surfaces accessible through side plates supporting the movement parts, the combination therewith of a boring forming a well on one side of the plate adjacent to said surface, through which a quantity of lubricant may be directed to the surface, said boring having a cover member spaced for a non-capillary distance from said well having an oil incompatible surface to retain an application of the oil and augment that applied to the surface independently of a supply of lubricant on said lubricated surfaces.

2. In a delicate instrument comprising a watch movement or the like having lubricated surfaces accessible through the side plates thereof, the combination therewith of a boring forming a well adajcent one side of the surface to be lubricated, and through which boring a quantity of lubricant may be directed to the surface, said boring having a covering member comprising jewel material spaced for a non-capillary distance from said well, to which an application of the lubricant may be applied to augment that applied to a lubricated surface independently of a supply of lubricant on said lubricated surfaces.

3. In a delicate instrument comprising a watch movement or the like having lubricated surfaces accessible through the side plates thereof, the combination therewith of a well adjacent a surface to be lubricated, a covering member for said well spaced for a non-capillary distance from said well comprising a jewel retaining an application of the oil lubricant to augment that applied to the surface independently of a supply of lubricant on said lubricated surfaces.

4. In a delicate instrument comprising a watch movement or the like having side jewel bearing surfaces supported in the side plates of the instrument, the combination therewith of a boring adjacent said bearing forming a well and a jewel covering member for said well spaced for a non-capillary distance from said well, for retaining a quantity of lubricant to augment the lubricant for the bearing independently of a supply of lubricant on said lubricated surfaces.

5. In an instrument in accordance with claim 4 wherein there is positioned between the covering member for said well and said bearing an apertured member combining with the cover member to retain the lubricant fed through said aperture to said bearing.

6. In an instrument in accordance with claim 4 wherein there is positioned between the covering member and said bearing, a freely slidable apertured member combining with the cover member to retain and distribute the lubricant fed through said aperture to said bearing.

7. In an instrument in accordance with claim 4 wherein there is positioned between the covering member for said well and said bearing a freely slidable apertured jewel member combining with the cover member to retain and distribute the lubricant fed through said aperture to said bearing.

8. In a delicate instrument comprising a watch movement or the like having jeweled side bearings accessible through the side plates thereof and in which the jewels include trunnions extending into a cavity for oil formed in said bearing forming a well, the combination therewith of a covering plate including a boring complementary to the boring for said jewel and a covering member for said well spaced for a non-capillary distance from said well comprising a jewel chased therein positioned to hold a lubricant independently of the supply in said oil cavity.

9. In a delicate instrument in accordance with claim 8 wherein the jewel comprising the cover member for said well is lenticular, with the convex surface thereof faced toward said well portion.

10. In an instrument comprising a watch movement or the like having plates and borings into which the stem of pinions are trunnioned, jewel side bearings for said trunnioned portions including an oil cavity forming a well, a covering plate for said boring and oil well spaced for a non-capillary distance from said well, a jewel chased in said last named boring for retaining an application of lubricant to augment the lubricant in the cavity of said jewel bearing independently of a supply of lubricant on said lubricated surfaces.

11. In an instrument comprising a watch movement or the like having plates and borings into which the stem of pinions are trunnioned, jewel side bearings for said trunnioned portions including an oil cavity, a covering plate for said boring forming an oil well spaced for a non-capillary distance from said well, a jewel chased in said last named boring for retaining an application of lubricant to augment the lubricant in the cavity of said jewel bearing, said cavity including a distributing jewel freely slidable in said cavity and outlining an oil distributing aperture.

12. In an instrument comprising a watch movement or the like having plates and borings into which the stem of pinions are trunnioned, jewel side bearings for said trunnioned portions including an oil cavity, a covering plate for said boring forming an oil well, a jewel chased in said last named boring for retaining an application of lubricant to augment the lubricant in the cavity of said jewel bearing, said cavity having a plurality of freely slidable jewels for distributing an application of lubricant from the covering jewel to said jewel bearing.

13. In an instrument comprising a watch movement or the like having plates and borings into which the stem of pinions are trunnioned, jewel side bearings for said trunnioned portions, each of which includes an oil cavity, a covering plate for said borings forming an oil well, a jewel chased in said last named boring and spaced from the oil cavity free from capillary influence, and retaining an application of lubricant to augment the lubricant in the cavity of said jewel bearing independently of a supply of lubricant on said lubricated surfaces.

RENÉ A. FIECHTER.

REFERENCES CITED

The following references are of record in the file of this patent:

UNITED STATES PATENTS

| Number | Name | Date |
|---|---|---|
| 2,229,428 | Thiebaud | Dec. 16, 1938 |
| 2,272,546 | Colomo | Feb. 10, 1942 |
| 2,426,526 | Boswell | Aug. 26, 1947 |

FOREIGN PATENTS

| Number | Country | Date |
|---|---|---|
| 167,229 | Switzerland | Mar. 1, 1934 |